United States Patent
Bringley et al.

(10) Patent No.: US 7,879,743 B2
(45) Date of Patent: Feb. 1, 2011

(54) STAIN AND SOIL RESISTANT TEXTILE ARTICLE

(75) Inventors: Joseph F. Bringley, Rochester, NY (US); Tiecheng Qiao, Webster, NY (US); Suresh Sunderrajan, Rochester, NY (US)

(73) Assignee: BigSky Technologies LLC, Rochester, NY (US)

( * ) Notice: Subject to any disclaimer, the term of this patent is extended or adjusted under 35 U.S.C. 154(b) by 224 days.

(21) Appl. No.: 11/859,308

(22) Filed: Sep. 21, 2007

(65) Prior Publication Data

US 2009/0081440 A1 Mar. 26, 2009

Related U.S. Application Data

(60) Provisional application No. 60/827,718, filed on Oct. 1, 2006.

(51) Int. Cl.
*B32B 5/02* (2006.01)
(52) U.S. Cl. .............................. 442/80; 442/79; 442/82
(58) Field of Classification Search .................. 442/79, 442/80, 82
See application file for complete search history.

(56) References Cited

U.S. PATENT DOCUMENTS

| | | | |
|---|---|---|---|
| 4,355,065 A | 10/1982 | DeMott | |
| 4,560,487 A * | 12/1985 | Brinkley | 428/96 |
| 4,617,057 A | 10/1986 | Plueddemann | |
| 5,760,126 A | 6/1998 | Engle et al. | |
| 5,908,663 A | 6/1999 | Wang et al. | |
| 6,759,127 B1 | 7/2004 | Smith et al. | |
| 2004/0241475 A1 | 12/2004 | Morabito | |
| 2005/0215678 A1 | 9/2005 | Ludtke et al. | |
| 2007/0221877 A1 * | 9/2007 | Audenaert et al. | 252/8.57 |

FOREIGN PATENT DOCUMENTS

EP 1 533 356 A1 5/2005

OTHER PUBLICATIONS

Renner, R., "Tracking the Dirty Byproducts of a World Trying to Stay Clean", Science, 306, 1887 (2004).
Olsen, G.W., et al., EPA Draft Risk Assessment: "On the potential human health effects associated with exposure to perfluorooctanoic acid and its salts", Jan. 4, 2005.
Olsen, G.W., et al. "Perfluorooctanesulfonate and other fluorochemicals in the serum of American Red Cross adult blood donors". Environ Health Perspect. 111,1892 (2003).
Solomon, G.M.; Weiss, P.M. "Chemical contaminants in breast milk: Time trends and regional variability". Environ Health Perspect. 110, A339 (2002).
Renner, R., "Growing concern over perfluorinated chemicals", Environmental Science and Technology, 35, 154 (2001).
Renner, R., "PFOA in People Food Wrappers May be an Important, Overlooked Source of Perfluorochemicals in Humans", Environmental Science and Technology Online News, May 23, 2007 htt;://pubs.acs.org/subscribe/journals/esthag-w/2007/may/science/rr_PFOApeople.html.
Bringley et al.; Controlled, Simultaneous Assembly of Polyethylenimine onto Nanoparticle Silica Colloids; Langmuir, 22, 4198 (2006).
Dix J.; Delong B.; Repellent treatments on stretchable and/or inherently flame retardant fabrics; Performance of Protective Clothing, editors McBriarty & Henry vol. IV. ASTM Digital Library, No. STP1133-EB, (1992).
Unofficial U.S. Appl. No. 12/504,368, filed Jul. 16, 2009.

* cited by examiner

*Primary Examiner*—Lynda Salvatore

(57) ABSTRACT

Disclosed in this specification is an aqueous dispersion for treating a textile. The dispersion generally includes surface-functionalized inorganic oxides in combination with a fluorochemical. Significantly lower concentrations of fluorochemicals are present in comparison to prior art dispersions.

23 Claims, No Drawings

STAIN AND SOIL RESISTANT TEXTILE ARTICLE

CROSS-REFERENCE TO RELATED APPLICATIONS

This application claims the benefit of priority of U.S. Provisional Patent Application Ser. No. 60/827,718 filed Oct. 1, 2006.

FIELD OF THE INVENTION

The present invention relates to aqueous dispersions and their use to treat textiles in order to impart oil and water repellency and to do so in environmentally effective ways so as to decrease the amount of fluorochemical required to provide the desired effects.

BACKGROUND OF THE INVENTION

Materials and processes for rendering the surfaces of articles water, oil, stain and soil resistant are in great demand in industries such as paints and coatings, textiles, paper, construction materials, marine materials, glass and windows, plastics, metals, and many others. Such materials provide protection from wear and dirt and improve the aesthetic qualities and lifetime of industrial and consumer articles. Currently, water, oil, stain and soil resistance is achieved by lowering the surface energy of a material such that water, oil and dirt do not stick to, or wet, the surface of the article. The water and/or oil simply rolls off, or can be easily removed from the article. This is commonly achieved today by applying a fluorochemical or fluoropolymer (such as Teflon) to the surface of an article and is typically done by applying a solution or suspension of the fluorochemical in water, or solvent, and removing the liquid phase by drying. The fluorochemical or fluoropolymer lowers the surface energy and a water and oil resistant coating is obtained.

There is a very serious problem, however, in that fluorochemicals, some materials used in preparation of fluorochemicals, and some decomposition products of fluorochemicals have been shown to be persistent in the environment and have been identified as probable carcinogens by the environmental protection agency (EPA). Further, some fluorochemicals have been shown to be bio-accumulative (the concentration of the chemical accumulates in the human body) and are not removed effectively by the excretion systems of the human body. The environmental and health impact of fluorochemicals and the need to limit their use has been highlighted in several recent publications. [Renner, R. "Tracking the dirty by-products of a world trying to stay clean", *Science,* 306, 1887 (2004). EPA Draft Risk Assessment: "On the potential human health effects associated with exposure to perfluorooctanoic acid and its salts", Jan. 4, 2005. Olsen G. W.; Church, T. R.; Miller, J. P.; Burris, J. M.; Hansen, K. J.; Lundberg, J. K.; Armitage, J. B.; Herron, R. M.; Medhdizadehkashi, Z.; Nobiletti, J. B.; O'Neill, E. M.; Mandel, J. H.; Zobel, L. R. "Perfluorooctanesulfonate and other fluorochemicals in the serum of American Red Cross adult blood donors". *Environ Health Perspect.* 111,1892 (2003). Solomon, G. M.; Weiss, P. M. "Chemical contaminants in breast milk: Time trends and regional variability". *Environ Health Perspect.* 110, A339 (2002). Renner, R. "Growing concern over perfluorinated chemicals", *Environmental Science and Technology,* 35, 154 (2001) and references therein.] A second, less serious, problem is that fluorochemicals are relatively expensive and costs prohibit their use in many applications.

There is a need for materials, methods and processes for rendering the surfaces of articles water, oil, stain and soil resistant that are not harmful to humans, animals or the environment. There is a need for materials, methods and processes that eliminate or significantly reduce fluorochemical usage in consumer items, while still providing the aesthetic appeal and increased use-life of industrial and consumer items. There is a need to provide such properties at a low cost to allow for their use in common industries.

U.S. Pat. No. 4,617,057 to Plueddeman discloses an oil and water repellent coating composition comprising a blend of an amino-organosilane, a perfluorinated organic compound and a resin selected from the group consisting of a colloidal inorganic based siloxane resin. The siloxane resin comprises an acidic dispersion of colloidal silica and hydroxylated silsesquioxane in an alcohol-water medium. Plueddeman further shows the utility of such compositions for treating clothing fabric such as cotton/polyester blends, see examples 9 and 10. However, the amount of fluorochemical in the treating solutions is 0.9% and 2% (by weight) respectively. Assuming 50% wet pick-up (this is a conservative estimate—most commercial textile treating solutions that are padded onto a textile fabric exhibit a wet pick-up between 60% and 80%) of the solution by the fabric this would correspond to a fluorochemical concentration on the dry fabric of 4,500 and 10,000 parts per million (ppm), respectively. Further, the colloidal inorganic-based siloxane employed is highly hydrophobic and exists as a dispersion in methanol and water. Such dispersions are harmful to the environment, because of their high concentration of volatile organic components (VOC's), and also very expensive.

U.S. Pat. No. 5,908,663 to Wang et al. discloses a method for treating carpets that, in one embodiment, involves applying to the carpet a fluorochemical and a silica colloid. The silica colloid may be used as received, or may be "grated with functional groups or polymers" Column 3, lines 56-57. Wang et al. further shows that the antisoiling properties of the carpet are improved. "Antisoiling" should be distinguished from water and oil repellency; antisoiling refers to the "relative resistance of the treated carpet to dry soiling" under, for example, walk-on conditions. Water and oil repellency refer to the ability of an article (fabric, carpet, textile) to repel liquid stains. Wang et al. shows that the water and oil repellency of the carpet is not improved when colloidal silica is combined with a fluorochemical treatment. When grafted or surface-functionalized silica colloids were employed with a fluorochemical, see Wang examples 80-82, only very poor water repellency values are obtained and most examples failed the oil test. The concentration of fluorochemical on the fabric is typically 1000 ppm (see example 60 and comparison example 40, and other examples in Table 9; 0.1% solids on carpet (SOC) are equivalent to 1000 ppm).

European patent application EP 1 533 356 A1 to Lens provides an aqueous dispersion of a fluorochemical compound, a cationic surfactant and colloidal inorganic particles. The dispersion is applied to textile fabrics such that (page 7, lines 10-12) the "amount of fluorochemical on the substrate is between 0.1 and 3.0% (1,000-30,000 ppm) by weight based upon the weight of the substrate". It is found (page 3, line 6-7) "the colloidal inorganic particles generally do not negatively impact the oil- and/or water repellency properties that can be imparted on a substrate treated with the composition".

U.S. Pat. No. 5,760,126 to Engle et al. discloses a water-based coating composition that comprises among other things, a fluorochemical and a colloidal dispersion of surface-functionalized, inorganic microparticles. The surface-modifications of the inorganic microparticle may be achieved using a silane coupling agent which is applied to the particle surfaces at a rate of $1 \times 10^{-4}$ to $7 \times 10^{-3}$ millimoles per square meter of particle surface area. However, the coatings only provide adequate water repellency and stain resistance when very high levels of fluorochemicals are applied to the substrate (coated article). For example, a fluorochemical loading of 8.1 to 17.7% is required to achieve a contact angle greater than 100 degrees. A contact angle greater than 120 degrees is typically considered to be indicative of good water repellency. Further, the coating compositions employ N-methylpyrrolidone (a material harmful to the environment) presumably as a dispersion aid.

It is desirable therefore to provide a water and oil repellent composition that eliminates or greatly minimizes the need for fluorochemicals in fabric and textile coating formulations. It is desirable to provide such compositions dispersed solely in aqueous coating formulations, without volatile organic components (VOCs) that are harmful to the environment. It is further desirable to provide coating compositions that are durable to washing and do not negatively impact the hand or feel of textiles and garments.

SUMMARY OF THE INVENTION

The invention relates to a stain resistant and water/oil repellent treated textile fabric that significantly reduces (decreases by a factor of 10 or more) the need for fluorochemicals in textile coatings. It has been discovered that surface-functionalized inorganic oxides (and/or oxyhydroxides) in combination with a fluorochemical, greatly enhances the water and oil repellency at low fluorochemical concentrations (from about 50-500 ppm, as measured by the concentration of atomic F on the fabric). This is a surprising result in view of the art which shows that such combinations, at fluorochemical concentrations typically used in the industry (greater than 500 ppm F, and more typically greater than 1000 ppm F) have a negative impact or, at best, no impact upon the water and oil repellency. The invention provides excellent performance, achieving water and oil repellency scores of 4 or greater, respectively, for F concentrations even below 100 ppm F.

The present invention relates to a treated textile with an oil repellency of 4 or greater, a water repellency of 4 or greater and a fluorine concentration by weight of treated fabric of between 20 and 500 ppm. The textile substrate is treated with an aqueous dispersion of surface treated particles and a fluorochemical. More specifically the treated textile has a fluorochemical chemically bound to the surface of inorganic particles and said surface of said inorganic particles has been surface modified with an agent chosen from the group of surface modifying agents consisting of polymers, cationic inorganic sols, silane coupling agents and hydrolyzed precursors of silane coupling agents.

The invention also relates to an aqueous dispersion for treating surfaces in order to impart water repellency and oil repellency, comprising surface functionalized inorganic particles, made of metal oxide particles, ranging in size between 2 to 500 nm, that have been surface functionalized with a surface functionalizing agent, are stably suspended in an aqueous medium with a fluorochemical chemically bound to the surface of said functionalized particles.

DETAILED DESCRIPTION OF A PREFERRED EMBODIMENT

The invention is directed toward producing stain resistant and water/oil repellent textile fabrics that greatly minimizes the need for fluorochemicals. As described previously fluorochemicals are harmful to the environment, persistent and have been shown to be bio-accumulative in animals and in human beings.

Terms and Definitions.

Fluorochemical concentrate is used herein to mean the fluorochemical solution or dispersion as received from the manufacturer or supplier.

Fluorochemical as defined herein refers to the active or solids portion of commercial fluorochemical concentrates as supplied by manufacturers, i.e., water is excluded.

Organo-fluorine group means any molecular group that is fluorinated or partially fluorinated and has at least one alkylfluorine subunit given by the general formula ($C_nF_{2n+1}$—); where n is greater than or equal to 3.

Fluorine concentration means the concentration of atomic fluorine, either in the treating solution or on the fabric, as specified.

Treating solution as used herein refers to the final diluted solution, including all addenda, that is used to treat the dry (untreated) fabric.

The present invention relates to treated textiles that are stain resistant and water/oil repellent, which have been made by treating them with aqueous dispersions comprising; water, surface-functionalized inorganic particles, fluorochemicals and optionally, a cross-linking agent, and optionally, a hydrophobic polymer, where the fluorine concentration by weight per weight of treated textile fabric is between 20 and 500.

The invention also relates to the aqueous dispersions used to treat textile materials, and other substrates such as wood, mortar or stone. These dispersions are stable dispersions of functionalized inorganic particles with chemically bound fluorochemical. The inorganic particles typically are between 2 to 500 nm, have been surface functionalized with a surface functionalizing agent, and are stably suspended in an aqueous medium.

Further treated textiles according to the present invention have oil and water repellencies greater than 6 and fluorochemical content of between 20 and 900 parts per million.

The treated textiles are the product of treating textiles in order to impart water and oil repellency by contacting textiles with the aqueous dispersion and then fixing the particles of the dispersion to the textile surfaces. Fixing the particles to the textile may involve using cross-linkers to chemically bind the particles to the textile surface.

The surface-functionalized inorganic particles of the invention are metal-oxide and/or metal oxy-hydroxides particles having a mean particle diameter from 2-500 nm. Preferably the particles have a mean particle diameter from 5-250 nm, and more preferably from 10-100 nm. The metal-oxide inorganic particles are selected from aqueous dispersible metal-oxide particles including, but not limited to, silica, alumina, zirconia, titania and zinc oxide. Specific examples include colloidal, precipitated or fumed silica, aluminas such as $Al_2O_3$ and its polymorphs, AlOOH (also known as boehmite), $ZrO_2$ and its oxy-hydroxide derivatives and related metal salts and derivatives, $TiO_2$ and ZnO. Also useful for carrying out the invention are mixed metal oxyhydroxides and clay minerals such as layered double hydroxides, hydrotalcite, smectic clays, hydroxy double salts, layered siliceous materials. Specific examples include:

layered double hydroxides (related to the mineral hydrotalcite) of the general formulas:

$$[M^{2+}_{1-x}M^{3+}_x(OH)_2]A^{n-}_{x/n} \cdot yH_2O$$

or $$[M^{1+}M^{3+}_2(OH)_6]A^{n-}_{x/n} \cdot yH_2O;$$

where $M^{1+}$ is typically Li or Na; $M^{2+}$ is typically Ca or Mg; and $M^{3+}$ is typically Fe or Al; A is an anion and is typically $NO_3^-$, $Cl^-$, or $CO_3^{2-}$, and layered siliceous materials such as natural or synthetic clay minerals exemplified by montmorillonite, bentonite, kaolin, vermiculite, talc and saponite, given by the general formula:

$$[M1,M2]_nZ_4O_{10}(OH)_2 \cdot H_2O_w;$$

where M1 is typically Al or Fe, M2 is typically Mg or Zn; and Z is Al or Si.

The preferred inorganic particles are colloidal, precipitated or fumed silicas having the general formula $SiO_2$. The particles are preferably stable aqueous colloidal mixtures. A stable aqueous colloidal mixture is one that does not settle or separate from aqueous dispersion for a period of at least one month or more.

The surfaces of the inorganic metal-oxide particles of the invention are functionalized with inorganic, polymeric or molecular species. The functionalized surfaces serve to convert the surface characteristics of the particles from hydrophilic to hydrophobic and, further, to provide a functionality such that the particles may be cross-linked (chemically bound) to the textile article and/or to reactive sites on the fluorochemical. Cross-linking serves to provide durability to the finish such that the stain and water/oil repellent properties survive launderings, weather (for outdoor fabrics), use and abrasion, etc.

The surfaces of the inorganic metal-oxide or metal(oxy) hydroxide particles of the invention are functionalized using surface functionalizing agents. The surface functionalizing agents are chemically linked to the particle either through covalent bonding, or through charge attraction. The surface functionalizing agents further preferably contain a "functional group" that is free to react with functional groups on the surfaces of the fabric, or with polymeric addenda in the treatment solution such as fluorochemicals, aliphatic polymers, resins and/or waxes. Suitable functional groups, capable of forming chemical bonds with the fabric or with polymeric addenda include carboxylate groups, hydroxyl groups, amine groups, amide groups, and thiol groups; and also including complexing inorganic metals or complexes such as aluminates, silicates and zirconates.

Surface functionalizing agents suitable for practice of the invention include cationic inorganic sols of aluminum and zirconium, such as aqueous solutions of $ZrOCl_2$, $ZrO(NO_3)_2$, ZrO(OH) acetate and $Al_2(OH)_5Cl$. These materials are available from Magnesium Electron Incorporated and from W.R. Grace & Co. Silica particles may be surface-functionalized with cationic inorganic sols via charge-charge attraction and subsequent formation of Si—O-M bonds.

The particles of the invention may also be surface-functionalized with polymers, especially amine containing polymers such as polyethylenimine, polyallylamine or polyamides, and siloxane polymers having amine or amide functionalities. Amine containing polymers may attach to the surface of silica particles via charge attraction upon protonation of the amine at a pH less than about 8. The preparation of silica dispersions having their particle surfaces functionalized with polyamines is described in "Controlled, simultaneous assembly of polyethylenimine onto nanoparticle silica colloids", Langmuir, 22, 4198 (2006).

The particles of the invention may have their surfaces functionalized by silane coupling agents, or hydrolyzed precursors of silane coupling agents having the general formula:

$$R_aR'_bSi(OR'')_{4-(a+b)};$$

where a and b are integers from 1 to 3, (a+b) is less than or equal to 3, R and R' are organic groups having from 1-30 carbon atoms and R" is H, or an organic group having from 1 to 6 carbon atoms.

Alternatively, the silane coupling agent may have the general formula:

$$R_aSi(X)_{4-a};$$

where a and R are as defined above and X is a halogen, Cl, Br or I.

Specific examples of silane coupling agents useful for practice of the invention include but are not limited to 3-chloropropyl(trimethoxy)silane, 3-chloropropyl(triethoxy)silane, 3-chloropropyldimethylmethoxysilane, 3-chloropropyltris(trimethylsiloxy)silane, 3-mercaptopropyl(trimethoxy) silane, 3-mercaptopropylmethyl(diethoxy)silane, methacryloxypropyl(trimethoxy)silane, 2-[methoxy(polyethyleneoxy)propyl](trichloro)silane, 2-[methoxy(polyethyleneoxy)propyl](trimethoxy)silane, octyl(trimethoxy)silane, octadecyl(trimethoxy)silane, 3-isocyanatopropyldimethylchlorosilane, 3-isocyanatopropyl(triethoxy)silane, Bis(2-hydroxyethyl)-3-aminopropyltriethoxysilane, aminopropylsilanetriol, 3-aminopropyl(triethoxy)silane, 3-aminopropyl(trimethoxy)silane, N-(2-aminoethyl)-3-aminopropylsilalletriol, N-(2-aminoethyl)-3-aminopropyl(trimethoxy)silane, N-(2-aminoethyl)-3-aminopropylmethyldimethoxysilane, isopropyl(trimethoxy) silane, (3-glycidoxypropyl)methyldimethoxysilane, tetradecyldimethyl(3-trimethoxysilylpropyl)ammonium chloride, (3-trimethoxysilylpropyl)diethylenetriamine and octadecyldimethyl(3-trimethoxysilylpropyl)ammonium chloride.

The aqueous dispersion of the invention comprises metal oxide and/or metal oxy hydroxide nanoparticles that are surface functionalized with a surface functionalizing agent. The surface functionalizing agent may be applied to the surfaces of said nanoparticles by mixing the nanoparticles with the surface functionalizing agent at an appropriate ratio in a high speed or high shear mixing apparatus. The appropriate ratio may be determined by measuring the saturation adsorption of the surface functionalizing agent on the nanoparticles. The saturation absorption describes the maximum number of surface functionalizing agents that may be adsorbed, or bound to, the particle surfaces per unit surface area, and has the units $\mu mol/m^2$. Typically, saturation adsorptions vary from about 0.5-5 $\mu mol/m^2$. Methods of measuring the saturation adsorption are described in Bringley et al. Langmuir 2006, 22, 4198-4207. It is highly preferred that the nanoparticles and the surface functionalizing agent are brought together at a ratio very near the saturation absorption; or within the range of 80 to 120% of that value, and more preferably within the range of about 90 to 110% of that value. This is preferred because at ranges well below the saturation adsorption stable colloids are not obtained, and at values well above the saturation adsorption, some portion of the surface functionalizing agent will not be bound to the nanoparticles but rather remain "free" in solution. To initiate the surface functionalization reaction, the nanoparticles and the surface functionalizing agent are mixed together in a high shear mixing zone within a dispersion medium. It is preferred that the dispersion medium is water, but other solvents or liquids may also be used. The high shear mixing zone may be provided by a propeller-like mixer, a static mixer, in-line mixers, dispersators, or other high shear mixing apparatus. The mixing efficiency of the apparatus is dependent upon the type of mixing method chosen and the precise geometry and design of the mixer. For propeller-like mixers the mixing efficiency may be approximated by the turnover rate, where the turnover rate is the stir rate (rev/sec.) times the turnover volume (ml/rev)) divided by the aqueous volume. For in-line or static mixers, the mixing efficiency may be approximated by multiplying the sum of the addition rates of the colloidal dispersions by the turnover volume of the mixer. In each case, the mixing efficiency has units of turnovers/sec. It is preferred that the mixing efficiency be greater than about 0.10 turnovers/sec. and more preferably greater than 1 turnover/sec. Complete mixing of the two solutions is preferably accomplished in less than about 10 seconds; and is more preferably accomplished substantially instantaneously.

The aqueous dispersions of the invention are stable colloidal dispersions. It is often the surface properties of the particles in the colloid, such as their electrostatic charge, which contribute to the stability of the colloid. Typically the surfaces are significantly charged, positive or negative, so as to provide electrostatic repulsion to overcome forces which would otherwise lead to the aggregation and settling of the particles from the colloid. It has been of interest to surface modify particles, or to "assemble" colloidal particles of opposite charge to achieve specific properties. However, this is often difficult since the surface modification or assembly disrupts the electrostatic and steric forces necessary for colloidal stability; and stable colloids are not easily obtained. Colloidal stability refers to the ability of the particles to remain stable in suspension (not settle or separate from the dispersion). Aqueous dispersions of particles that remain in suspension for more than 30 days can be considered stable. It is preferred that the dispersion maintains stability for more than six months. The colloidal stability of a dispersion may be determined by a number of methods. The dispersion may be placed in a tall, narrow glass container and the settling rate monitored visually over a period of months. A more quantitative approach is to measure the average particle size diameter of the particles in the dispersion. Unstable colloids show a tendency to aggregate or agglomerate (particles begin to "stick" to one another), this aggregation is observed as an increase in the average particle diameter of the particles in the dispersion. Stable colloids show very little change in the average particle size diameter over a period of months and preferably over a period of greater than six months.

It is important that the surface functionalization of the particles be performed in such a manner so as to provide a stable colloidal suspension that has a high concentration of solids and a low viscosity. It is preferred that the concentration of solids is at least greater than 5.0% (by weight per weight of colloidal suspension), and more preferably greater than 10.0%. It is preferred that that the viscosity is less than 1000 centipoise and more preferably less than 100 centipoise.

The aqueous dispersions of the invention should not contain aggregates, agglomerates, or the like. Aggregation or agglomeration of the surface functionalized particles of the invention can lead to poor performance and poor utilization of chemistry. The presence of aggregates and agglomerates can be determined by measuring the average particle diameter of the dispersion and the particle size distribution. Because the surface functionalizing agents are molecular in scale, the average particle diameter should not change significantly upon application of the surface functionalizing agent to the nanoparticles. The degree of change is dependent upon the size of the surface functionalizing agent and the size of the nanoparticles. It is preferred that, upon application of the surface functionalizing agent, the average particle diameter of the nanoparticles should not increase by more than a factor of three, and more preferably by more than a factor of two. The particle size(s) of the colloidal particles of the aqueous dispersions of the invention may be characterized by a number of methods, or combination of methods, including coulter methods, light-scattering methods, sedimentation methods, optical microscopy and electron microscopy. Light-scattering methods may sample $10^9$ or more particles and are capable of giving excellent colloidal particle statistics. Light-scattering methods may be used to give the percentage of particles existing within a given interval of diameter or size, for example, 90% of the particles are below a given value. Light-scattering methods can be used to obtain information regarding mean particle size diameter, the mean number distribution of particles, the mean volume distribution of particles, standard deviation of the distribution(s) and the distribution width for nanoparticulate particles. In the aqueous dispersions of the invention, it is preferred that at least 90% of the particles be less than 4-times the mean particle size diameter, and more preferably that at least 90% of the particles are less than 3-times the mean particle size diameter. The mean particle size diameter may be determined as the number weighted (mean size of the total number of particles) or as the area, volume or mass weighted mean. It is preferred that the volume or mass weighted mean particle size diameter be determined, since larger particles having a much greater mass are more prominently counted using this technique. In addition, a narrow size-frequency distribution for the particles may be obtained. A measure of the volume-weighted size-frequency distribution is given by the standard deviation (sigma) of the measured particle sizes. It is preferred that the standard deviation of the volume-weighted mean particle size diameter distribution is less than the mean particle size diameter, and more preferably less than one-half of the mean particle size diameter.

Fluorochemicals useful for practice of the invention include any of the commercial fluorochemicals used to impart stain and oil/water resistance to textile fabrics. Fluorochemicals are typically complex random co-polymers that contain a variety of substituents including, fluoroalkyl co-monomers containing organo-fluorine groups that provide both water and oil repellency, non-fluorinated co-monomers such as alkyl monomers to provide water repellency and to achieve good film-forming properties, small amounts of hydrophilic monomers to aid in stabilization of the polymer in aqueous solution, and cross-linkable groups such as amines so that the complex polymer can be permanently cross-linked to functional groups on the natural or synthetic fabric. Suitable fluorochemicals include any of the organo-fluorine group-containing organic compounds including polymeric and oligomeric compounds. These polymeric and oligomeric compounds typically contain one or more organo-fluorine groups that contain a perfluorinated carbon chain having from 3 to about 16 carbon atoms and preferably 4 to 8 carbons. The organo-fluorine groups may be straight-chained, branched or cyclic fluorinated alkyl or alkylene groups. Fully fluorinated groups are preferred. Perfluorinated aliphatic groups of the general formula ($C_nF_{2n+1}$—) are the most preferred organo-fluorine groups. Especially preferred are organo-fluorine groups wherein n is between 4 and 8, since such groups show the least toxicity and persistence in the environment.

The fluorochemicals useful in the invention preferably contain non-fluorinated co-monomers. It is preferred that the concentration of non-fluorinated co-monomers be as high as possible without sacrificing the stain and water/oil repellent properties of the polymer. Typical non-fluorinated co-monomers may be methyl methacrylate, dodecylmethacrylate, octadecylmethacrylate, butyl acrylate, and polyvinylchloride. The non-fluorinated co-monomers may also contain hydrophilic groups to aid in the dispersibility of the polymer in aqueous solution, examples include polyethyleneglycol-methacrylates and -acrylates, and 2-hydroxyethylacrylate.

The fluorochemicals useful in the invention also preferably contain a cross-linkable moiety. A cross-linkable moiety refers to an organic functional group that may react at a temperature between about 20-150° C. and form a covalent bond with functionalities on the surfaces of the individual fibers of the fabric. The functional group may react directly with functionalities on the surface of the individual fibers or may react with a "cross-linker", a molecule that has multiple reactive sites and essential binds, or reacts with, both the fluoropolymer and the fabric. Examples of cross-linkable moieties include carboxylate groups, hydroxyl groups, amine groups, amide groups, and thiol groups. Examples of cross-linkers include melamine resins, isocyanates and polyisocyanates. Preferred cross-linkers are blocked polyisocyanates which react only at elevated temperatures usually during the drying and curing stages.

Fluorochemicals are typically provided to the textile industry as a concentrate that is later diluted to a specific concentration and is then applied to the fabric. The term "treating solution" is hereafter used to refer to the diluted concentrate (which may include additives such as surfactants, wetting aids, solvents, cross-linkers, etc.) that is applied to the fabric. The treating solution is applied to the fabric by padding (dipping), spraying or foaming of the fabric with the solution. The wet pickup of the fabric typically ranges from 20-80% (by weight). One skilled in the art may determine the proper dilution of the concentrate by knowledge of the fabric weight and the wet pick-up of the particular process used and the desired performance (water and oil repellency rating) of the fabric.

As described above, fluorochemicals are typically complex random co-polymers and contain a variety of substituents in addition to organo-fluorine containing components. Further, the percentage of organo-fluorine containing monomers and the chemical structure of the monomers may vary significantly between different manufacturers. In addition, fluorochemicals may contain emulsifiers and dispersion aids, and may be sold at a variety of concentrations, i.e., as measured by the percentage of solids. Further, not all of the components of the concentrate are harmful to the environment. Manufacturers continue to optimize these formulations with the aim of decreasing the concentrations of harmful chemicals, in particular the substituents that contain organo-fluorine groups. To compare directly the potential environmental benefits (advantages or disadvantages) of given commercial textile treatment formulations, it is necessary to measure the concentration of organo-fluorine containing groups. Organo-fluorine groups contain atomic fluorine, F. The proportion of atomic F in the concentrate is related directly to the concentration of organo-fluorine containing groups in the concentrate. The fluorine (atomic fluorine (F)) concentration may be determined simply via elemental analysis of the concentrate, and can therefore be used as a measure of the active fluorochemical concentration in commercial formulations. This analysis provides an appropriate comparison of commercial fluorochemicals (i.e., as a measure of the environmentally harmful component of the concentrate), since the fluorine concentration is directly related to the degree of organo-fluorine groups in the formulation.

The invention provides a treated textile fabric wherein the fluorine concentration by weight per weight of treated textile fabric is between 20 and 500 ppm. The fluorochemical is applied to the fabric at a solids-on-fabric (SOF) level from 20-500 ppm F, as measured from the fluorine concentration in the fluorochemical.

The SOF is defined by the formula:

$SOF = [(\text{fraction wet pick-up}) \times (\text{conc. F in treating solution})]/\text{weight fabric}$ The concentration F (in parts-per-million per weight of fabric, ppm F) as applied to fabric can therefore be determined from the treating solution concentration and the wet pick-up using the following equation:

$$ppm\ F = \frac{[(\text{wet pick up}(g)) \times (FC\ \text{solids in treating solution}\ (g/g)) \times (F conc.\ (g/g))]}{\text{weight fabric}\ (g)} \times 10^6$$

This analysis gives an accurate determination of the fluorochemical content used to produce a given performance and further is able to elucidate potential environmental benefits since an equal performance at a lower fluorochemical concentration represents a clear environmental benefit.

The aqueous dispersion of the invention may be applied to textiles by a number of methods common in the art including padding, spraying, foaming or other methods. Coating aids such as dispersants, wetting aids, emulsifiers may be employed in the treating solution if desired. The aqueous dispersion of the invention may be combined with other textile coating chemistries such as UV absorbers, antimicrobials, flame retardants, lubricants and fabric softeners. One skilled in the art my determine the proper concentration of the various chemistries via experimentation. In order to provide durability to everyday wear and to laundering it is preferred that the aqueous dispersion contain a crosslinking agent. A crosslinking agent is typically a polymer, oligomer or small molecule that is reactive with functional groups such as amines and hydroxyl groups on the fabric and with similar functionalities on the polymer to be coated. Thus the dried coating is chemically bound to the fabric. Suitable crosslinkers for practice of the invention are melamine, epoxy, isocyanate or polyisocyanate resins. Preferred cross-linkers are blocked polyisocyanates which react only at elevated temperatures, usually during the drying and curing stages. After application of the aqueous dispersion to the fabric, the water is removed by drying, typically at elevated temperature. It is preferred that the drying is done at a temperature between about 70 and 125° C. It is further preferred that after the fabric is dry it is further cured to facilitate the cross-linking reaction so as to increase the durability of the coating. It is preferred that the curing temperature is between about 125-199° C., and more preferably between 150 and 175° C.

If properly applied, the aqueous treating dispersion provides a soil and stain resistant treated textile that repels both oil and water. The degree of repellency can be determined by a number of methods common in the industry. The standard methods are defined in the "description of testing methods" section herein. It is preferred that the treated textile has a water repellency of at least 3, and more preferably 4 or greater as given by the 3M test method. It is preferred that the treated textile has a oil repellency of at least 3, and more preferably 4 or greater as given by the AATCC-118 test method. It is preferred that the treated textile is durable to multiple launderings, and continues to show a high degree of repellency after repeated washings. It is preferred that the treated textile is durable to at least 5 launderings, and more preferably at least 10 launderings, and even more preferably at least 25 or more launderings.

Textiles suitable for application of the invention include all woven and non-woven textiles, including those used for clothes, apparel, sports wear, rain jackets, etc. Other appropriate textiles include those used for furniture such as upholstery, drapes, carpets, curtains, wall-coverings, etc. Outdoor and industrial textiles are suitable such as tents, awnings, covers, boat-covers, and outdoor carpets. The aqueous dispersion of the invention may be applied to textiles that are synthetic or natural. Suitable fabrics include, but are not limited to cotton, wool, ramie, polyester, polyproylene, nylon, acrylic, lycra, and their blends.

Materials and Methods

All materials concentrations are given as a weight to weight percentage unless otherwise noted. All dispersions are in water unless otherwise noted.

Nalco 1140 a trademarked product sold by Nalco Chemical Company is a 40.0% colloidal silica dispersion available from having an average particle size diameter of 15 nm.

ST-50 a trademarked product sold by Nissan Chemical Company is a 50.0% colloidal silica dispersion having an average particle size diameter of 15 nm.

Catapal 200 a trademarked product sold by Sasol inc. is a dispersible powder of the formula AlOOH.

Cab-O-Sperse PG-001 is a trademarked product that is a 30.0% aqueous dispersion of fumed silica with an average particle diameter of about 200 nm.

TG-580, a trademarked product sold by Daikin America, is a 30.0% fluorochemical dispersion; elemental analysis indicated that the fluorine concentration was 28.52% per gram of solids, or 0.11 g/g concentrate.

NUVA HPU, a trademarked product sold by Clariant Corporation, is a 30.0% fluorochemical dispersion; elemental analysis indicated that the fluorine concentration was 23.95% per gram of solids, or 0.10 g/g concentrate.

MEI-ZAA a trademarked product sold by Magnesium Electron Incorporated is a 22.0% dispersion of zirconium oxyhydroxyacetate.

Octadecyl(trimethoxy)silane, Octyl(trimethoxy)silane, 3-aminopropyl(triethoxy)silane, thiolpropylsilane, chloropropylsilane and dimethyloctadecyl[3-(trimethoxysilyl)propyl ammonium chloride are available from Aldrich Chemicals.

A1230 a trademarked product sold by GE silicones is a polyethylene glycol modified trimethoxysilane.

Polydimethylsiloxane polymers are available from Gelest, Inc.

IPA-ST a trademarked product sold by Nissan Chemical is a colloidal silica dispersion in isopropyl alcohol, 30.0% solids and having an average particle size distribution of 15 nm.

Description of Testing Methods.

Materials were tested using standardized methods as given in the textile manual of the American association of textile chemists and colorists, 1993.

a) Water Repellency (WR) Test

Water repellency was tested according to the 3M water repellency test II (May 1992). The rating scale is 0-10 with 0 indicating the lowest and 10 the highest degree of repellency. The 3M test scale consists of a series of mixtures of isopropanol (IPA) and water that systematically varies the surface tension. The 3M compositions and the rating scale are given in the Table below.

| Volume % water | Volume % IPA | Score |
|---|---|---|
| 100 | 0 | 0 |
| 90 | 10 | 1 |
| 80 | 20 | 2 |
| 70 | 30 | 3 |
| 60 | 40 | 4 |
| 50 | 50 | 5 |
| 40 | 60 | 6 |
| 30 | 70 | 7 |
| 20 | 80 | 8 |
| 10 | 90 | 9 |
| 0 | 100 | 10 |

A test sample is placed on a flat, horizontal surface and three drops of each liquid above are applied to the test sample in small drops about 3-5 mm in diameter using a pipette. The drops are allowed to stand for 10 seconds and if after this time at least two of the three drops are still visible on the surface the sample is deemed to have passed the test. In all cases scores are assessed as the highest rating for which the fabric passes the test. If all of the liquids wet the fabric the example is given a failure rating (F).

b) Oil Repellency (OR) Test

Oil repellency was tested according to the AATCC test method 118-2000. The rating scale is 0-8 with 0 indicating the lowest and 8 the highest degree of repellency. The compositions and the rating scale are given in the Table below.

| Liquid | Score |
|---|---|
| Mineral oil | 1 |
| 65/35 mineral oil/n-hexadecane | 2 |
| n-hexadecane | 3 |
| n-tetradecane | 4 |
| n-dodecane | 5 |
| n-decane | 6 |
| n-octane | 7 |
| n-heptane | 8 |

A test sample is placed on a flat surface, horizontal surface and one or two drops of each liquid above are applied to the test sample in small drops about 3-5 mm in diameter using a pipette. The drops are allowed to stand for 60 seconds and if after this time they are still visible on the surface and no visible wetting is observed the sample is deemed to have passed the test. In all cases scores are assessed as the highest rating for which the fabric passes the test. If all of the liquids wet the fabric the example is given a failure rating (F).

Application of treatment solutions onto fabrics. Materials were diluted with water as necessary to obtain treating solutions with active ingredients as given in the Tables. All examples and comparison examples were evaluated by applying the treatment solutions onto 4"×5" pieces of fabric. The fabrics were chosen from 100% polyester; a 55:45 blend of polyester/cotton and 100% polypropylene as indicated. Excess treating solution was removed from the cloth by applying pressure via a nip roller. The weight of the fabric before and after application of the treating solution was measured and the wet pick-up of the solution calculated as [(weight after treatment−weight before treatment)/weight before treatment]×100%. The samples were then dried and cured in a forced air convection oven at 125° C. for 10 minutes and removed from the oven. Treated fabrics were tested as given above.

Durability and Home Laundering. The durability of the stain resistant finish of the invention was compared to that of comparison examples by washing two identically treated pieces of each fabric in a home washer using a common commercial laundering soap. After washing the fabrics were dried in a home dryer. The washing and drying cycle was repeated three times for each sample. The examples of the invention and comparison examples were run at the same time to minimize variability. Water and oil repellency scores were averaged over the identical samples. The test as described is hereafter referred to as HL-3.

Determination of Fluorine concentration. The concentration F (in parts-per-million per weight of fabric, ppm F) as applied to fabric was determined from the treating solution concentration and the wet pick-up using the following equation:

$$ppm\ F = \frac{[(\text{wet pick up}(g)) \times (FC\ \text{solids in treating solution} (g/g)) \times (Fconc.\ (g/g))]}{\text{weight fabric}\ (g)} \times 10^6$$

Preparation of surface-functionalized particles-1 (SMP-1). 600.0 grams of a 40.0% colloidal silica dispersion (Nalco 1140) was mixed with 300.0 g of water and the pH adjusted to 5.0 by the addition of a few drops of glacial acetic acid. A 22.0% zirconium acetate solution (486.0 g) was then added slowly to the colloidal dispersion with vigorous stirring and the resulting dispersion allowed to stir for 1 hour. This suspension was stored for subsequent surface modification and is hereafter referred to as SMP-1, 25.0% solids. Surface modification of the silica colloid was confirmed by electrophoretic mobility and calculation of the zeta potential (a measure of the charge near the surface of the suspended particles. Before surface modification the silica particles have a zeta potential of about −30 mV at pH=5, whereas after modification the particles have a zeta potential of about +35 mV at pH=5. The change in the sign of the zeta potential is indicative of a chemical modification of the surface of the particles. The particles have a mean particle size diameter of about 34 nm and are stable (do not settle or aggregate) in suspension for more than six months.

EXAMPLES AND COMPARATIVE EXAMPLES 1-23

Preparation of Treating Solutions without Surface-Functionalized Particles.

Comparison Example 1

A 0.06% solution of fluorochemical was prepared as follows: 1.00 g of TG-580 was diluted to 500.0 g total with distilled water.

Comparison Example 2

A 0.12% solution of fluorochemical was prepared as follows: 1.00 g of TG-580 was diluted to 250.0 g total with distilled water.

Comparison Example 3

A 0.24% solution of fluorochemical was prepared as follows: 1.00 g of TG-580 was diluted to 125.0 g total with distilled water.

Comparison Example 4

A 0.36% solution of fluorochemical was prepared as follows: 1.00 g of TG-580 was diluted to 83.33 g total with distilled water.

Comparison Example 5

A 0.48% solution of fluorochemical was prepared as follows: 1.00 g of TG-580 was diluted to 62.5 g total with distilled water.

Comparison Example 6

A 1.0% solution of fluorochemical was prepared as follows: 1.00 g of TG-580 was diluted to 30.0 g total with distilled water.

Comparison Example 7

A 2.0% solution of fluorochemical was prepared as follows: 1.00 g of TG-580 was diluted to 15.0 g total with distilled water.

Comparison Example 8

A 0.06% solution of fluorochemical was prepared as follows: 1.00 g of NUVA HPU was diluted to 500.0 g total with distilled water.

Comparison Example 9

A 0.12% solution of fluorochemical was prepared as follows: 1.00 g of NUVA HPU was diluted to 250.0 g total with distilled water.

Comparison Example 10

A 0.24% solution of fluorochemical was prepared as follows: 1.00 g of NUVA HPU was diluted to 125.0 g total with distilled water.

Comparison Example 11

A 0.36% solution of fluorochemical was prepared as follows: 1.00 g of NUVA HPU was diluted to 83.33 g total with distilled water.

Comparison Example 12

A 0.48% solution of fluorochemical was prepared as follows: 1.00 g of NUVA HPU was diluted to 62.5 g total with distilled water.

Comparison Example 13

A 1.0% solution of fluorochemical was prepared as follows: 1.00 g of NUVA HPU was diluted to 30.0 g total with distilled water.

Comparison Example 14

A 2.0% solution of fluorochemical was prepared as follows: 1.00 g of NUVA HPU was diluted to 15.0 g total with distilled water.

Preparation of Treating Solutions Containing Surface-Functionalized Particles.

Example 15

2.00 g of SMP-1 was added to 497.2 g distilled water with stirring, followed by the addition of 0.80 g of TG-580.

Example 16

2.00 g of SMP-1 was added to 497.0 g distilled water with stirring, followed by the addition of 1.00 g of TG-580.

Example 17

1.00 g of SMP-1 was added to 248.25 g distilled water with stirring, followed by the addition of 0.75 g of TG-580.

Example 18

1.00 g of SMP-1 was added to 248.0 g distilled water with stirring, followed by the addition of 1.00 g of TG-580.

Example 19

1.00 g of SMP-1 was added to 123.0 g distilled water with stirring, followed by the addition of 1.00 g of TG-580.

Example 20

1.00 g of SMP-1 was added to 81.33 g distilled water with stirring, followed by the addition of 1.00 g of TG-580.

Example 21

1.00 g of SMP-1 was added to 60.50 g distilled water with stirring, followed by the addition of 1.00 g of TG-580.

Example 22

1.00 g of SMP-1 was added to 28.0 g distilled water with stirring, followed by the addition of 1.00 g of TG-580.

Example 23

1.00 g of SMP-1 was added to 13.0 g distilled water with stirring, followed by the addition of 1.00 g of TG-580.

The examples and comparison examples were applied to 100% polyester fabric and tested as described above.

TABLE 1

Water and oil repellency ratings for examples(E) and comparison examples(CE) applied to 100% polyester fabric.

| Example(E) or Comparison Example(CE) | % FC solids in treating solution | % SMP-1 in treating solution | % wet pick-up | ppm F on fabric | WR | OR |
|---|---|---|---|---|---|---|
| CE-1 | 0.06 | 0 | 48 | 80 | F | F |
| CE-2 | 0.12 | 0 | 51 | 170 | F | F |
| CE-3 | 0.24 | 0 | 47 | 320 | 1 | 1 |
| CE-4 | 0.36 | 0 | 49 | 500 | 3 | 2 |
| CE-5 | 0.48 | 0 | 44 | 600 | 4 | 3 |
| CE-6 | 1.0 | 0 | 54 | 1540 | 7 | 6 |
| CE-7 | 2.0 | 0 | 48 | 2740 | 8 | 7 |
| CE-8 | 0.06 | 0 | 42 | 60 | F | F |
| CE-9 | 0.12 | 0 | 41 | 120 | F | F |
| CE-10 | 0.24 | 0 | 41 | 240 | 1 | F |
| CE-11 | 0.36 | 0 | 41 | 360 | 4 | 3 |
| CE-12 | 0.48 | 0 | 41 | 480 | 4 | 4 |
| CE-13 | 1.0 | 0 | 39 | 930 | 7 | 6 |
| CE-14 | 2.0 | 0 | 39 | 1870 | 7 | 7 |
| E-15 | 0.05 | 0.10 | 49 | 70 | 4 | 4 |
| E-16 | 0.06 | 0.10 | 47 | 80 | 5 | 4 |
| E-17 | 0.09 | 0.10 | 44 | 110 | 6 | 5 |
| E-18 | 0.12 | 0.10 | 44 | 150 | 7 | 6 |
| E-19 | 0.24 | 0.2 | 49 | 340 | 8 | 7 |
| E-20 | 0.36 | 0.3 | 47 | 480 | 8 | 7 |
| E-21 | 0.48 | 0.4 | 48 | 660 | 8 | 7 |
| E-22 | 1.0 | 0.83 | 51 | 1450 | 8 | 7 |
| E-23 | 2.0 | 1.67 | 50 | 2850 | 8 | 7 |

FC is flurochemical,
ppm F refers to the ppm fluorine on fabric as defined above.
WR = water repellency score;
OR = oil repellency score.

The data of Table 1 shows that the treated fabrics of the invention have significantly improved water, and especially improved in oil repellency at low fluorine concentrations (<500 ppm). At high fluorine concentrations (>1000 ppm), no improvement in water and oil repellency is indicated. In general, water and oil repellency scores of 4 and 4, respectively, are considered acceptable to the industry. A factor of ten, or more, reduction in fluorochemical use is achieved by the invention.

EXAMPLES AND COMPARATIVE EXAMPLES (24-38)

The treating solutions of examples and comparison examples 1-23 were applied to 50:50 polyester/cotton fabric and tested as described above.

TABLE 2

Water and oil repellency ratings for examples(E) and comparison examples(CE) applied to 50:50 polyester/cotton fabric.

| Example(E) or Comparison Example(CE) | Treating solution used | % FC solids in treating solution | % SMP-1 in treating solution | % wet pick-up | ppm F on fabric | WR | OR |
|---|---|---|---|---|---|---|---|
| CE-24 | CE-8 | 0.06 | 0 | 61 | 90 | F | F |
| CE-25 | CE-9 | 0.12 | 0 | 68 | 200 | 1 | F |
| CE-26 | CE-10 | 0.24 | 0 | 62 | 360 | 3 | 2 |
| CE-27 | CE-11 | 0.36 | 0 | 60 | 520 | 4 | 4 |
| CE-28 | CE-12 | 0.48 | 0 | 60 | 690 | 6 | 5 |
| CE-29 | CE-13 | 1.0 | 0 | 54 | 1290 | 8 | 7 |
| CE-30 | CE-14 | 2.0 | 0 | 61 | 1460 | 8 | 7 |
| E-31 | E-15 | 0.05 | 0.10 | 60 | 80 | 3 | 2 |
| E-32 | E-16 | 0.06 | 0.10 | 60 | 100 | 4 | 3 |
| E-33 | E-17 | 0.09 | 0.10 | 63 | 160 | 6 | 4 |
| E-34 | E-18 | 0.12 | 0.10 | 64 | 220 | 7 | 6 |
| E-35 | E-19 | 0.24 | 0.2 | 53 | 340 | 8 | 6 |
| E-36 | E-20 | 0.36 | 0.3 | 65 | 480 | 8 | 7 |
| E-37 | E-21 | 0.48 | 0.4 | 61 | 660 | 8 | 7 |
| E-38 | E-22 | 1.0 | 0.83 | 62 | 1450 | 8 | 7 |

The data of Table 2 shows that treated polyester/cotton fabrics of the invention have significantly improved water, and especially improved in oil repellency at low fluorine concentrations (<500 ppm), when compared to the comparison examples. At high fluorine concentrations (>1000 ppm), no improvement in water and oil repellency is indicated. A factor of ten, or more, reduction in fluorochemical use is achieved by the invention.

EXAMPLES AND COMPARATIVE EXAMPLES
(39-53)

The treating solutions of examples and comparison examples 1-23 were applied to 100% polypropylene fabric and tested as described above.

TABLE 3

Water and oil repellency ratings for examples(E) and comparison examples(CE) applied to 100% polypropylene fabric.

| Example(E) or Comparison Example(CE) | Treating solution used | % FC solids in treating solution | % SMP-1 in treating solution | % wet pick-up | ppm F on fabric | WR | OR |
|---|---|---|---|---|---|---|---|
| CE-39 | CE-8  | 0.06 | 0    | 52 | 80   | F | F |
| CE-40 | CE-9  | 0.12 | 0    | 43 | 120  | F | F |
| CE-41 | CE-10 | 0.24 | 0    | 44 | 230  | 3 | 2 |
| CE-42 | CE-11 | 0.36 | 0    | 51 | 410  | 4 | 3 |
| CE-43 | CE-12 | 0.48 | 0    | 48 | 550  | 5 | 4 |
| CE-44 | CE-13 | 1.0  | 0    | 42 | 1010 | 8 | 7 |
| CE-45 | CE-14 | 2.0  | 0    | 43 | 2060 | 8 | 7 |
| E-46  | E-15  | 0.05 | 0.10 | 60 | 80   | 3 | 2 |
| E-47  | E-16  | 0.06 | 0.10 | 60 | 100  | 4 | 3 |
| E-48  | E-17  | 0.09 | 0.10 | 63 | 160  | 6 | 4 |
| E-49  | E-18  | 0.12 | 0.10 | 64 | 220  | 7 | 6 |
| E-50  | E-19  | 0.24 | 0.2  | 53 | 340  | 8 | 6 |
| E-51  | E-20  | 0.36 | 0.3  | 65 | 480  | 8 | 7 |
| E-52  | E-21  | 0.48 | 0.4  | 61 | 660  | 8 | 7 |
| E-53  | E-22  | 1.0  | 0.83 | 62 | 1450 | 8 | 7 |

The data of Table 3 shows that treated polypropylene fabrics of the invention have significantly improved water, and especially improved in oil repellency at low fluorine concentrations (<50 ppm), when compared to the comparison examples. At high fluorine concentrations (>1000 ppm), no improvement in water and oil repellency is indicated.

Preparation of surface-functionalized particles-2 (SMP-2). To 20.0 g of SMP-1 above was added, with vigorous stirring, 40.0 g water followed by 1.0 mL of GE silicones A1230 and 2.4 mL of octyl(trimethoxy)silane. The dispersion was allowed to stir vigorously for 24 hours to allow for the reaction of the silanes with the surface of the particles, hereafter referred to as SMP-2, 13.2% solids.

Preparation of surface-functionalized particles-3 (SMP-3). To 20.0 g of SMP-1 above was added, with vigorous stirring, 40.0 g water followed by 1.0 mL of A1230 and 2.0 mL of octadecyl(trimethoxy)silane. The dispersion was allowed to stir vigorously for 24 hours to allow for the reaction of the silane with the surface of the particles, hereafter referred to as SMP-3, 12.7% solids.

Preparation of surface-functionalized particles-4 (SMP-4). To 20.0 g of SMP-1 above was added, with vigorous stirring, 40.0 g water followed by 0.5 mL of 3-aminopropyl(triethoxy)silane and 1.0 mL of dimethyloctadecyl[3-(trimethoxysilyl)propyl]ammonium chloride (72% in methanol). The dispersion was allowed to stir vigorously for 24 hours to allow for the reaction of the silane with the surface of the particles, hereafter referred to as SMP-4, 10.6% solids.

Preparation of surface-functionalized particles-5 (SMP-5). 100.0 g of Cab-O-Sperse PG-001 was diluted with 200.0 g distilled water and, while stirring, the pH adjusted to 5.0 though the addition of glacial acetic acid. Separately, 2.8 mL of 3-aminopropyl(triethoxy)silane was diluted to 20.0 mL with distilled water and, while stirring, the pH adjusted to 5.0 with glacial acetic acid. The two solutions were combined with stirring and 3.0 mL of dimethyloctadecyl[3-(trimethoxysilyl)propyl]ammonium chloride (72% in methanol) was added. The dispersion was allowed to stir vigorously for 24 hours to allow for the reaction of the silane with the surface of the particles, hereafter referred to as SMP-5, 10.9% solids.

Preparation of surface-functionalized particles-6 (SMP-6). 10.0 g of Catapal 200 (AlOOH) powder was dispersed in 90.0 g of distilled water. To the stirred suspension was then add slowly, (0.93 mL of 3-aminopropyl(triethoxy)silane dissolved in 10.0 mL water) and, while stirring, the pH adjusted to 5.0 with glacial acetic acid. The dispersion was heated to 80° C. for 12 hours to allow for the reaction of the silane with the surface of the particles, hereafter referred to as SMP-6, 9.8% solids.

Preparation of Treating Solutions Containing Surface-Functionalized Particles SMP 2-6.

Example 54

3.78 g of SMP-2 was added to 495.2 g distilled water with stirring, followed by the addition of 1.00 g of TG-580.

Example 55

3.78 g of SMP-2 was added to 245.2 g distilled water with stirring, followed by the addition of 1.00 g of TG-580.

Example 56

3.94 g of SMP-3 was added to 495.1 g distilled water with stirring, followed by the addition of 1.00 g of TG-580.

Example 57

3.94 g of SMP-3 was added to 245.1 g distilled water with stirring, followed by the addition of 1.00 g of TG-580.

Example 58

4.72 g of SMP-4 was added to 494.3 g distilled water with stirring, followed by the addition of 1.00 g of TG-580.

Example 59

4.72 g of SMP-4 was added to 244.3 g distilled water with stirring, followed by the addition of 1.00 g of TG-580.

Example 60

9.20 g of SMP-5 was added to 489.8 g distilled water with stirring, followed by the addition of 1.00 g of TG-580.

Example 61

9.20 g of SMP-5 was added to 239.8 g distilled water with stirring, followed by the addition of 1.00 g of TG-580.

Example 62

10.20 g of SMP-6 was added to 488.8 g distilled water with stirring, followed by the addition of 1.00 g of TG-580.

Example 63

10.20 g of SMP-6 was added to 238.8 g distilled water with stirring, followed by the addition of 1.00 g of TG-580.

The treating solutions of examples and comparison examples (54-65) were applied to 50:50 polyester/cotton fabric and tested as described above.

TABLE 4

Water and oil repellency ratings for examples(E) and comparison examples(CE) applied to 50:50 polyester/cotton fabric.

| Example(E) or Comparison Example(CE) | Treating solution Used | % FC solids in treating solution | % SMP in treating solution | % wet pick-up | ppm F on fabric | WR | OR |
|---|---|---|---|---|---|---|---|
| E-54 | E-54 | 0.06 | 0.10 | 63 | 110 | 5 | 4 |
| E-55 | E-55 | 0.12 | 0.20 | 64 | 220 | 6 | 6 |
| E-56 | E-56 | 0.06 | 0.10 | 61 | 100 | 5 | 4 |
| E-57 | E-57 | 0.12 | 0.20 | 58 | 200 | 7 | 5 |
| E-58 | E-58 | 0.06 | 0.10 | 57 | 100 | 4 | 4 |
| E-59 | E-59 | 0.12 | 0.20 | 55 | 190 | 5 | 5 |
| E-60 | E-60 | 0.06 | 0.20 | 64 | 110 | 7 | 5 |
| E-61 | E-61 | 0.12 | 0.40 | 60 | 220 | 7 | 6 |
| E-62 | E-62 | 0.06 | 0.20 | 62 | 110 | 4 | 3 |
| E-63 | E-63 | 0.12 | 0.40 | 63 | 220 | 6 | 4 |
| CE-64 | CE-1 | 0.06 | 0 | 64 | 110 | F | F |
| CE-65 | CE-2 | 0.12 | 0 | 53 | 180 | 1 | F |

The data of Table 4 shows that a variety of surface functionalized particles may be utilized to achieve the results of the invention and have acceptable water and oil repellency scores even at fluorine concentrations as low as 100-200 ppm.

Comparison Example 65

A commercial fluorochemical free water repellent SM-8715 available from Dow Corning was diluted to 4.0% active solids with water (2.0 mL SM-8175 in 18.0 mL distilled water). The resulting solution was patted onto 100% cotton fabric and dried at 110° C. for 10 minutes.

Comparison Example 66

A commercial fluorochemical free water repellent 2-9034 available from Dow Corning was diluted to 5.0% active solids with water (2.0 mL 2-9034 in 18.0 mL distilled water). The resulting solution was patted onto 100% cotton fabric and dried at 110° C. for 10 minutes.

Comparison Example 67

A commercial fluorochemical free water repellent DC-520 available from Dow Corning was diluted to 4.0% active solids with water (2.0 mL Z-DC-520 in 18.0 mL distilled water). The resulting solution was patted onto 100% cotton fabric and dried at 110° C. for 10 minutes.

Comparison Example 68

A commercial fluorochemical free water repellent Z-6689 available from Dow Corning was diluted to 10.0% active solids with 50/50 IPA-water (1.0 mL Z-6689 in 9.0 mL IPA/water). The resulting solution was patted onto 100% cotton fabric and dried at 110° C. for 10 minutes Example 69

To 10.0 g Nissan ST-50 was added 40.0 g distilled water and 0.700 g silane A1230 from GE silicones. This suspension was stirred 1.5 hours followed by the addition of 2.08 mL of dimethyloctadecyl[3-(trimethoxysilyl)propyl]ammonium chloride (72.0% in methanol) and the suspension allowed to stir for 24 hours. To the stirred colloid was then added 10.0 g of TG-580, followed by enough water to reach a final total volume of 100.0 mL. The dispersion showed good colloidal stability (lack of settling) over a period of >10 days. 2.00 mL of the above solution was then added into 18.0 mL water and patted onto 100% cotton fabric and dried at 110° C. for 10 minutes.

Example 70

To 10.0 g Nissan ST-50 was added 40.0 g distilled water and 1.4 g silane A1230 from GE silicones. This suspension was stirred 1.5 hours followed by the addition of 2.08 mL of dimethyloctadecyl[3-(trimethoxysilyl)propyl]ammonium chloride (72.0% in methanol) and the suspension allowed to stir for 24 hours. To the stirred colloid was then added 10.0 g of TG-580, followed by enough water to reach a final total volume of 100.0 mL. The dispersion showed good colloidal stability (lack of settling) over a period of >10 days. 2.00 mL of the above solution was then added into 18.0 mL water and patted onto 100% cotton fabric and dried at 110° C. for 10 minutes.

Example 71

To 10.0 g Nissan ST-50 was added 40.0 g distilled water and 1.4 g silane A1230 from GE silicones. This suspension was stirred 1.5 hours followed by the addition of 3.33 ml, of dimethyloctadecyl[3-(trimethoxysilyl)propyl]ammonium chloride (72.0% in methanol) and the suspension allowed to stir for 24 hours. To the stirred colloid was then added 10.0 g of TG-580, followed by enough water to reach a final total volume of 100.0 mL. The dispersion showed good colloidal stability (lack of settling) over a period of >10 days. 2.00 mL of the above solution was then added into 18.0 mL water and patted onto 100% cotton fabric and dried at 110° C. for 10 minutes.

TABLE 5

Examples (E69-71) and comparison examples (CE65-68).

| Example(E) or Comparison Example(CE) | Comment | % active | Water repellency | Oil repellency |
|---|---|---|---|---|
| CE-65 | commercial silane water repellent | 4.0 | F | F |
| CE-66 | commercial silane water repellent | 5.0 | F | F |
| CE-67 | commercial silane water repellent | 4.0 | 3 | F |
| CE-68 | commercial silane water repellent | 10.0 | F | F |
| E-69 | | 1.1 | 6 | 5 |
| E-70 | | 1.2 | 6 | 5 |
| E-71 | | 1.3 | 6 | 6 |

The data of Table 5 shows that the inventive examples perform far better than commercial silane-based (non-fluorochemical) water repellents even at significantly lower application levels.

EXAMPLES AND COMPARATIVE EXAMPLES 72-74

Example 72

To 10.0 g of silica colloid IPA-ST was added 0.47 mL of octyl(trimethoxy)silane and 0.47 mL of octadecyl(trimethoxy)silane, five drops of glacial acetic acid were added and the solution allowed to stir 18 hours to complete the modification of the silica colloid surfaces. 1 mL of the above solution was then added into 2.0 mL IPA in 7.0 mL water, and tested on cotton fabric in an identical manner to previous examples.

Comparison Example 73

Prepared in an identical manner as that of Example 19 except that both the octyl(trimethoxy)silane and octadecyl(trimethoxy)silane were omitted from the treating solution.

Comparison Example 74

To 10.0 mL of isopropyl alcohol was added 0.47 mL of octyl(trimethoxy)silane and 0.47 mL of octadecyl(trimethoxy)silane. 1 mL of the above solution was then added into 2.0 mL IPA in 7.0 mL water, and tested on cotton fabric in an identical manner to previous examples.

TABLE 6

Water and oil repellency ratings for examples(E) and comparison examples(CE).

| Example(E) or Comparison Example(CE) | Composition | Water repellency | Oil repellency | observation |
|---|---|---|---|---|
| E-72 | 3.0% surface-functionalized silica | 4 | 5 | |
| CE-73 | 3.0% Silica only | 0 | 0 | Water/oil wet immediately |
| CE-74 | Surface functionalizing agent only | 0 | 0 | Water/oil wet immediately |

The data of Table 6 indicate that surface functionalized particles can be used to obtain fabrics with acceptable water and oil repellency even if fluorochemicals are excluded altogether. In this case the application levels are quite high and the hand of the fabric is stiffened somewhat compared to fluorochemical treatments.

Preparation of Treating Solutions Containing Non-Surface-Functionalized Inorganic Particles.

A concentrate was prepared as follows: 12.5 g of a colloidal silica dispersion (Nalco 1140, 40.0% solids) was diluted with water and the pH adjusted to 5.0 through the addition of glacial acetic acid to a total weight of 80.0 g. To the stirred suspension was then added 20.0 g of a fluorochemical concentrate from Daikin America (TG-580, 30.0% solids). This concentrate is referred to hereafter as UMP-1.

Comparison Example 75

A treating solution was prepared by adding 1.0 g UMP-1 to 99.0 g distilled water.

Comparison Example 76

A treating solution was prepared by adding 1.0 g UMP-1 to 49.0 g distilled water.

Comparison Example 77

A treating solution was prepared by adding 1.0 g UMP-1 to 24.0 g distilled water.

Comparison Example 78

A treating solution was prepared by adding 1.0 g UMP-1 to 15.67 g distilled water.

Comparison Example 79

A treating solution was prepared by adding 4.0 g UMP-1 to 16.0 g distilled water.

Preparation of Treating Solutions Containing Surface-Functionalized Inorganic Particles A concentrate was prepared as follows: 47.17 g of the surface-functionalized colloidal silica/zirconia particles SMP-4 was diluted with water and the pH adjusted to 5.0 through the addition of glacial acetic acid to a total weight of 80.0 g. To the stirred suspension was then added 20.0 g of a fluorochemical concentrate from Daikin America (TG-580, 30.0% solids). This concentrate is referred to hereafter as SMP-7.

Example 80

A treating solution was prepared by adding 1.0 g SMP-7 to 99.0 g distilled water.

Example 81

A treating solution was prepared by adding 1.0 g SMP-7 to 49.0 g distilled water.

Example 82

A treating solution was prepared by adding 1.0 g SMP-7 to 24.0 g distilled water.

Example 83

A treating solution was prepared by adding 1.0 g SMP-7 to 15.67 g distilled water.

The examples and comparison examples were applied to 100% polyester fabric tested as described above. The durability of the finishes were compared via a home laundering test as described above.

TABLE 7

Water and oil repellency ratings for examples(E) and comparison examples(CE) applied to 100% polyester fabric. Data compares unmodified inorganic particles to surface-functionalized inorganic particles.

| Example(E) or Comparison Example(CE) | % FC solids in treating solution | % UMP in treating solution | % wet pick-up | ppm F on fabric | WR | OR | After HL-3 WR | OR |
|---|---|---|---|---|---|---|---|---|
| CE-75 | 0.06 | 0.05 | 32 | 60 | F | F | | |
| CE-76 | 0.12 | 0.10 | 37 | 130 | 0 | F | | |
| CE-77 | 0.24 | 0.20 | 31 | 210 | 1 | F | | |
| CE-78 | 0.36 | 0.40 | 35 | 360 | 2 | 2 | | |
| CE-79 | 1.20 | 1.0 | 36 | 1200 | 8 | 7 | 3 | 2 |

TABLE 7-continued

Water and oil repellency ratings for examples(E) and
comparison examples(CE) applied to 100% polyester fabric.
Data compares unmodified inorganic particles to
surface-functionalized inorganic particles.

| Example(E) or Comparison Example(CE) | % FC solids in treating solution | % SMP in treating solution | % wet pick-up | ppm F on fabric | WR | OR | After HL-3 WR | OR |
|---|---|---|---|---|---|---|---|---|
| E-80 | 0.06 | 0.05 | 47 | 80 | 5 | 4 | | |
| E-81 | 0.09 | 0.10 | 44 | 110 | 6 | 4 | | |
| E-82 | 0.12 | 0.20 | 44 | 150 | 6 | 5 | | |
| E-83 | 0.24 | 0.40 | 49 | 340 | 8 | 7 | 7 | 6 |

The data of Table 7 indicates that the surface-functionalized particles of the invention offer superior water and oil repellency when compared to the un-modified particles of the comparison examples. Further, the data shows that the surface-functionalized particles of the invention provide superior durability, presumably because the functional groups on the surface of the particles are able to cross-link with functional groups on the fluoropolymer, and with functional groups of the surface of the fabric.

What is claimed is:

1. A treated textile comprising:
a textile substrate treated with an aqueous dispersion of surface treated particles and a fluorochemical, said treated textile substrate exhibiting oil repellency, water repellency and having a fluorine concentration, by weight of treated fabric, of between about 20 and 500 ppm, wherein said fluorochemical coating is chemically bound to the surface of inorganic particles and said surface of said inorganic particles has been surface modified with an agent chosen from the group of surface modifying agents consisting of silane coupling agents and hydrolyzed precursors of silane coupling agents.

2. An aqueous dispersion, for treating surfaces in order to impart water repellency and oil repellency, comprising
surface functionalized inorganic particles, comprising
metal oxide particles, ranging in size between 2 to 500 nm, that have been surface functionalized with a surface functionalizing agent, and are stably suspended in an aqueous medium; and
a fluorochemical that is chemically bound to the surface of said functionalized particles and exhibits a concentration in the aqueous dispersion of at least about 80 parts by weight of surface functionalized inorganic particles per 100 parts by weight of fluorochemical compound.

3. The aqueous dispersions of claim 2 wherein said metal-oxide particles are chosen from the group consisting of metal-oxide and/or metal oxy-hydroxides particles having a mean particle diameter from 2-500 nm.

4. The aqueous dispersions of claim 3 wherein said metal-oxide particles are selected from aqueous dispersible metal-oxide particles consisting of silica, alumina, zirconia, titania and zinc oxide and mixtures thereof.

5. An aqueous dispersion, for treating surfaces in order to impart water repellency and oil repellency, comprising:
surface functionalized inorganic particles, comprising
metal oxide particles, ranging in size between 2 to 500 nm, that have been surface functionalized with a surface functionalizing agent, are stably suspended in an aqueous medium, wherein said surface functionalizing agent is selected from cationic inorganic sols of aluminum and zirconium, and
a fluorochemical that is chemically bound to the surface of said functionalized particles, and exhibits a concentration in the aqueous dispersion of at least about 80 parts by weight of surface functionalized inorganic particles per 100 parts by weight of fluorochemical compound.

6. The aqueous dispersion of claim 2 wherein said surface functionalized inorganic particles have been functionalized with polymers.

7. An aqueous dispersion, for treating surfaces in order to impart water repellency and oil repellency, comprising:
surface functionalized inorganic particles, comprising
metal oxide particles, ranging in size between 2 to 500 nm, that have been surface functionalized with a surface functionalizing agent, are stably suspended in an aqueous medium;
a fluorochemical that is chemically bound to the surface of said functionalized inorganic particles, and exhibits a concentration in the aqueous dispersion of at least about 80 parts by weight of surface functionalized inorganic particles per 100 parts by weight of fluorochemical compound; and
wherein said surface functionalized inorganic particles have been functionalized with polymers and said polymers are amine containing polymers chosen from the group of polymers consisting of polyethylenimine, polyallylamines, polyamides, and siloxane polymers having amine or amide functionalities.

8. An aqueous dispersion, for treating surfaces in order to impart water repellency and oil repellency, comprising:
surface functionalized inorganic particles, comprising
metal oxide particles, ranging in size between 2 to 500 nm, that have been surface functionalized with a surface functionalizing agent, are stably suspended in an aqueous medium, wherein said surface functionalized inorganic particles have been functionalized with silane coupling agents, or hydrolyzed precursors of silane coupling agents having the general formula:

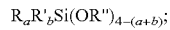
$R_a R'_b Si(OR'')_{4-(a+b)}$;

where a and b are integers from 1 to 3, (a+b) is less than or equal to 3, R and R' are organic groups having from 1-30 carbon atoms and R'' is H, or an organic group having from 1 to 6 carbon atoms; and
a fluorochemical that is chemically bound to the surface of said functionalized particles, and exhibits a concentration in the aqueous dispersion of at least about 80 parts by weight of surface functionalized inorganic particles per 100 parts by weight of fluorochemical compound.

9. An aqueous dispersion, for treating surfaces in order to impart water repellency and oil repellency, comprising:
surface functionalized inorganic particles, comprising
metal oxide particles, ranging in size between 2 to 500 nm, that have been surface functionalized with a surface functionalizing agent, are stably suspended in an aqueous medium, wherein said surface functionalized inorganic particles have been functionalized with silane coupling agents, or hydrolyzed precursors of silane coupling agents having the general formula:

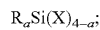
$R_a Si(X)_{4-a}$;

where a is an integer from 1 to 3, R is an organic group having from 1-30 carbon atoms and X is a halogen, Cl, Br or I; and a fluorochemical that is chemically bound to the surface of said functionalized particles, and exhibits a concentration in the aqueous dispersion of at least about 80 parts by weight of surface functionalized inorganic particles per 100 parts by weight of fluorochemical compound.

10. The aqueous dispersion of claim 2 which provides a treated article with a fluorine concentration between about 50 and 500 ppm per weight of the article.

11. An aqueous dispersion for treating surfaces in order to impart water repellency and oil repellency comprising
surface functionalized inorganic particles, comprising
metal oxide particles, ranging in size between 2 to 500 nm, that have been surface functionalized with a surface functionalizing agent, are stably suspended in an aqueous medium; and
a fluorochemical that is chemically bound to the surface of said functionalized particles,
wherein the dispersion has a viscosity of less than 1000 cP, a solids concentration of greater than 5% and a mean particle diameter of less than 100 nm.

12. The aqueous dispersion of claim 11 wherein the particles are selected from aqueous dispersible metal-oxide particles selected from the group consisting of silica, alumina, zirconia, titania and zinc oxide and mixtures thereof.

13. The aqueous dispersion of claim 11 wherein said surface functionalized inorganic particles have been functionalized with cationic inorganic sols of aluminum and zirconium.

14. The aqueous dispersion of claim 11 wherein said surface functionalized inorganic particles have been functionalized with polymers.

15. The aqueous dispersion of claim 13 wherein said polymers are amine containing polymers chosen from the group of polymers consisting of polyethylenimine, polyallylamines, polyamides, and siloxane polymers having amine or amide functionalities.

16. The aqueous dispersion of claim 11 wherein said surface functionalized inorganic particles have been functionalized with silane coupling agents, or hydrolyzed precursors of silane coupling agents having the general formula:

$R_a R'_b Si(OR'')_{4-(a+b)}$;

where a and b are integers from 1 to 3, (a+b) is less than or equal to 3, R and R' are organic groups having from 1-30 carbon atoms and R" is H, or an organic group having from 1 to 6 carbon atoms.

17. The aqueous dispersion of claim 11 wherein said surface functionalized inorganic particles have been functionalized with silane coupling agents, or hydrolyzed precursors of silane coupling agents having the general formula:

$R_a Si(X)_{4-a}$;

where a is an integer from 1 to 3, R is an organic group having from 1-30 carbon atoms and X is a halogen, Cl, Br or I.

18. The aqueous dispersion of claim 11 wherein when used it provides a treated textile with a fluorine concentration between about 50 and 500 ppm.

19. An aqueous dispersion, for treating surfaces in order to impart water repellency and oil repellency, comprising
surface functionalized inorganic particles, comprising
metal oxide particles, ranging in size between 2 to 500 nm, that have been surface functionalized with a surface functionalizing agent, are stably suspended in an aqueous medium, wherein said surface functionalized inorganic particles are functionalized with silane coupling agents; and
a fluorochemical that is chemically bound to the surface of said functionalized particles, and exhibits a concentration in the aqueous dispersion of at least about 80 parts by weight of surface functionalized inorganic particles per 100 parts by weight of fluorochemical compound.

20. The aqueous dispersion of claim 2, applied to treat a textile substrate.

21. An aqueous dispersion, for treating surfaces in order to impart water repellency and oil repellency, comprising
surface functionalized inorganic particles, comprising
metal oxide particles, ranging in size between 2 to 500 nm, that have been surface functionalized with a surface functionalizing agent, are stably suspended in an aqueous medium, wherein said surface functionalized inorganic particles are functionalized with silane coupling agents;
a fluorochemical that is chemically bound to the surface of said functionalized particles, and exhibits a concentration in the aqueous dispersion of at least about 80 parts by weight of surface functionalized inorganic particles per 100 parts by weight of fluorochemical compound; and
the aqueous dispersion is applied to treat a textile substrate.

22. A method for treating textiles to impart stain resistance, comprising:
a. providing a textile substrate;
b. contacting said substrate with a stable aqueous dispersion of surface-functionalized particles and a fluorochemical to produce a treated textile substrate, wherein the flammability of the treated textile substrate exhibits an oil repellency of 4 or greater, a water repellency of 4 or greater, and a fluorine concentration, by weight of treated fabric, of between about 20 and 900 ppm; and
functionalizing the surface functionalized particles with silane coupling agents, or hydrolyzed precursors of silane coupling agents.

23. The aqueous dispersion of claim 2, wherein the concentration of the functionalized particles is up to about 333 parts by weight of surface functionalized inorganic particles per 100 parts by weight of fluorochemical compound.

* * * * *